United States Patent [19]

Popma et al.

[11] Patent Number: 4,820,926

[45] Date of Patent: Apr. 11, 1989

[54] RADIATION CONVERSION SCREEN

[75] Inventors: Theo J. A. Popma, Enschede; Jacob A. Den Boer, Eindhoven, both of Netherlands

[73] Assignee: U.S. Philips Corporation, New York, N.Y.

[21] Appl. No.: 909,811

[22] Filed: Sep. 22, 1986

[30] Foreign Application Priority Data

Mar. 19, 1986 [NL] Netherlands ........................ 8600696

[51] Int. Cl.[4] ........................................ G01J 1/58

[52] U.S. Cl. ............................ 250/486.1; 250/487.1

[58] Field of Search ................ 250/483.1, 486.1, 487.1

[56] References Cited

U.S. PATENT DOCUMENTS

| | | | |
|---|---|---|---|
| 3,769,059 | 10/1973 | Driard et al. | 250/483.1 |
| 4,039,840 | 8/1977 | Shimiya et al. | 250/486.1 |
| 4,398,118 | 8/1983 | Galves et al. | 313/527 |
| 4,437,011 | 3/1984 | Noji et al. | 250/486.1 |

FOREIGN PATENT DOCUMENTS

| | | | |
|---|---|---|---|
| 0150535 | 11/1980 | Japan | 250/483.1 |

*Primary Examiner*—Carolyn E. Fields
*Assistant Examiner*—Richard Hanig
*Attorney, Agent, or Firm*—Jack E. Haken

[57] ABSTRACT

A radiation conversion screen having sub-layers with mutually different radiation-conversion, radiation-optical and/or technological properties wherein successive sub-layers of luminescent material have a luminescent radiation absorption which decreases in the propagation direction of the radiation beam.

13 Claims, 1 Drawing Sheet

RADIATION CONVERSION SCREEN

Figure 1:
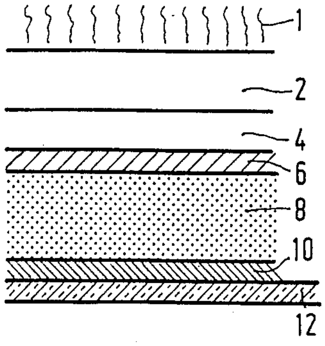

The invention relates to a radiation conversion screen which includes a luminescent layer which is sensitive to radiation to be detected.

A radiation conversion screen of this kind is known from U.S. Pat. No. 4,475,032 and is used, for example in X-ray diagnostic apparatus. When such an apparatus includes an X-ray film detection device such as a film camera or a Bucky grid, the conversion screen forms an X-ray intensifier screen which is to be arranged in the X-ray beam in front of the film foil. When such an apparatus includes an X-ray image intensifier tube, the conversion screen forms the entrance screen, the exit screen or both screens of this tube. Even though the different types of screen evidently have different properties due to the different environments of operation and use, substantially similar requirements are imposed as regards the actual conversion function. This is applicable notably as regards the required high X-ray absorption and high conversion efficiency with a high resolution for an image-carrying radiation beam. To achieve this, a high luminescent light yield per intercepted radiation quantum and a minimum of lateral scattering of the luminescent light produced in the conversion layer are desirable. When the luminescent layer is comparatively thin, the radiation absorption will be comparatively low and when the layer is comparatively thick, the scattering of light in the layer will be comparatively extensive if no special steps are taken. In the cited state of the art this problem is mitigated by the use of layers having a high density; plasma spraying is as suitable method for obtaining such layers, for example as described in U.S. Pat. No. 4,475,032. It is often impossible to satisfy the requirements as regards high resolution completely notably in the case of hard X-rays, so that a compromise must be accepted. U.S. Pat. No. 3,825,763 describes a conversion layer in which the layer of luminescent material is structured. Layers having such a structure which collimates the luminescent light are widely used, notably in X-ray image intensifier tubes. The crackled structure described therein can be obtained by cooling down the screen, that is to say the layer of luminescent material with an appropriate carrier, after the deposition of the luminescent material or after the heating thereof in order to increase the conversion efficiency of the luminescent material, at such a rate that a crackled structure with a frequency adapted to the resolution is obtained and that the layer does not come loose from the carrier. The formation of a desired crackled structure can be facilitated to a high degree by the method of deposition of the layer of luminescent material, the circumstances in which the process is carried out such as the type and structure of the carrier, the deposition rate and the carrier temperature during deposition, the ambient pressure during vapour deposition and the temperature and the duration of firing, if any.

It is the object of the invention to provide a radiation conversion screen in which the attractive properties of both described layers are combined and the drawbacks of each individual layer are mitigated. To achieve this, a radiation conversion screen of the kind set forth in accordance with the invention is characterized in that the luminescent layer is composed of sub-layers which succeed one another in the direction of incidence of a radiation beam to be detected and each of which has mutually different radiation-conversion, radiation-optical and/or technological properties. By utilizing sub-layers having mutually different properties, viewed in the thickness direction of the luminescent layer, several properties which are contradictory per se in the case of homogeneous layers can be optimized because structure can be formed whereby said compromise for the overall layer is shifted in the positive direction and a substantial gain can be achieved as regards efficiency, resolution etc. Moreover boundary layers of sub-layers can be adapted to the requirements imposed as regards transitions between successive layers, and boundary layers of the overall layer can be adapted to the locally desired properties.

Viewed in the direction of propagation of radiation to be detected, successive sub-layers in a preferred embodiment exhibit a decreasing absorption for the luminescent light generated by the radiation to be detected. This can be achieved by forming sub-layers having a mutually different morphologly from the same luminescent material. The sub-layers may gradually change one into the other or may form comparatively abrupt transitions. By a suitable choice of the structure it can also be achieved that the inherent structure noise of the layers decrease in the direction of the radiation to be detected. Generally, specific properties adapted to the location of the sub-layers in the overall can be imparted to a top layer, to a base layer or to both layers.

A first layer in a preferred embodiment is formed by a comparatively thin layer of $CaWO_4$ which is succeeded by a comparatively thick layer of BaFCl (Eu). A top layer notably consists of $CaWO_4$ and a base layer of, for example CsI or Re oxibromide.

A conversion layer in accordance with the invention may consist of two sub-layers, but also may be provided with several other layers such as protective, transmission or coating layers.

The conversion layer in a preferred embodiment forms part of an X-ray intensifier screen and includes a first sub-layer formed, for example by flame or plasma spraying and having an increased density, thereon further sub-layers may be provided. Such a high-density layer can act as a sealing layer, as an optical transmission layer but also as an independent carrier for further layers. These functions may also be important, for example for an entrance screen of X-ray image intensifier tubes in which the quality of the optical transmission between notably the conversion layer and the photocathode makes an essential contribution to the efficiency and the resolution of the tube. A dense layer is also attractive for reducing mutual contamination in successive layers, for realizing a suitably consecutive backing for the thin photocathode layer, and for ensuring adequate lateral electrical conductivity in the layer.

A base layer of the conversion layer is composed of, for example a layer having a structure which is favourabler for conducting light. Such a layer can be obtained, for example, by vapour deposition. By variation of parameters during the vapour deposition process, the morphology can be varied in the thickness direction of the layer. For example, the optical conductivity can thus be improved and the structure noise in the emerging luminescent light can be reduced.

Figure 2:
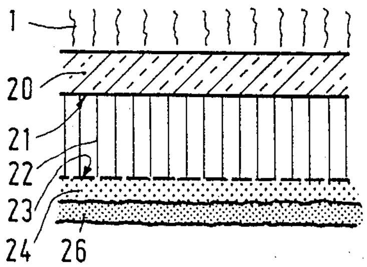
Figure 3:
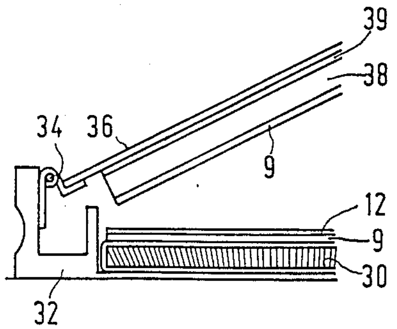
Figure 4:
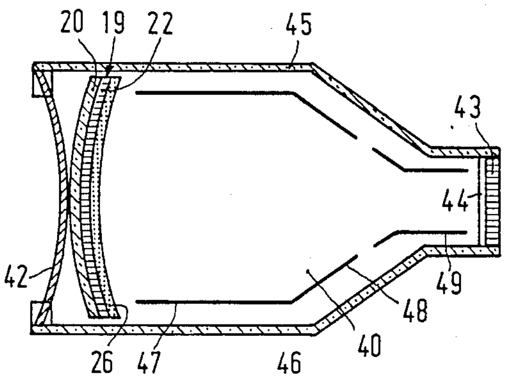
Figure 5:
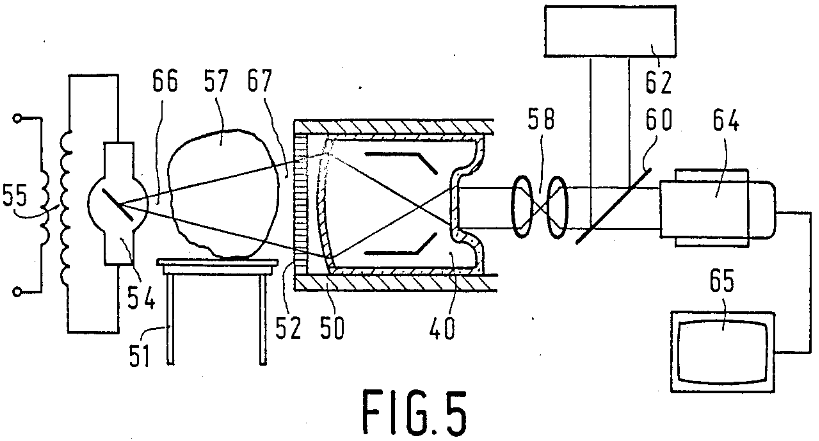

Some preferred embodiments in accordance with the invention will be described in detail hereinafter with reference to the drawing. Therein:

FIG. 1 shows a conversion screen in the form of an X-ray intensifier screen,

FIG. 2 shows a conversion screen in the form of an entrance screen for an X-ray image intensifier tube, FIG. 3 shows a cassette provided with a conversion screen as shown in FIG. 1, FIG. 4 shows an X-ray image intensifier tube provided with an entrance screen as shown in FIG. 2, and FIG. 5 shows an X-ray image intensifier/television chain which includes at least one conversion screen in accordance with the invention.

Viewed in the direction of an incident X-ray beam 1, an intensifier screen as is shown in FIG. 1 includes a base layer 2, which is made of, for example polyester. This layer is flexible and capable of resisting moisture and the like. This strong layer can be detached, if desired, in order to be used again. An antistatic layer 4 prevents the occurence of potential fields across the layer, thus preventing the occurrence of disturbing discharge phenomena which would also occur in an image to be formed. Inter alia because of a suitably chosen refractive index, a reflection layer 6 will reflect a maximum amount of the luminescent light which is emitted in the direction thereof and which is generated in a luminescent layer 8 by incident X-rays. The luminescent layer is sealed in a conventional manner by means of a protective layer 10 which, like the base layer, is also highly moisture-resistant and which protects the luminescent layer also against mechanical damage. The protective layer 10 is preferably washable.

The luminescent layer 8 constitutes the active layer of the assembly and forms the specified subject of the invention. In such an X-ray imaging screen an optimum combination of the following properties is pursued: noise, X-ray efficiency, absorption, light yield and resolution. These properties are at least partly contradictory; for example, the quantum efficiency increases as the layer thickness increases, that is to say for as long as no saturation occurs. The light yield increases as the thickness of the layer increases, but this increase quickly deteriorates which is notably due to scattering of luminescent light in the layer. The layer structure remaining the same, the resolution of the layer decreases as the layer thickness decreases. When use is made of a layer composed of several sub-layers, it is ensured that luminescent light which is generated in areas of the layer which are situated furthest from a film layer 12 to be connected thereto is absorbed to only a comparatively low degree by layers of the luminescent layer or layers which are situated nearer to the film layer. Comparatively speaking, the structure noise is the least in a layer or layers situated near the film. The structure noise in a layer or layers situated further away is greater. This intensified noise is filtered out by the layer or layers situated nearer to the film. The grain size of different layer is adapted to the distance between the respective layers and the film. Proceeding in the direction away from the film, the grain size preferably increases; gradually a change-over may take place from coarse grains which usually have a high efficiency to smaller grains which offer better light conductivity and improved optical transmission. A thin top layer near the film may then be micro-crystalline, so that this layer can also serve to prevent penetration by moisture as well as a mechanical protection. The additional protective layer can then be dispensed with or be formed by a gradual transition from a crystalline top layer of luminescent material to a layer similar to the known protective layer. This can be achieved by gradually increasing the mixing ration of luminescent material and protective material, forming the basic material for, for example a flame or plasma spraying device, to 1 in favour of the protective material.

Within the scope of the described possibilities, a screen includes, for example a layer of BaFCl (Eu) with a top layer (invariably being the layer situated near the film for this type of screen) consisting of fine-grained $CaWO_4$. When the thickness ratio is reversed, a screen is obtained which includes a layer of $CaWO_4$ and a lower layer of BaFCl (Eu). The latter screen deviates from the previous described screen notably as regards speed of response.

Instead of BaFCl, CsI can alternatively be used for the above screens. Drawbacks imposed by the hygroscopic nature thereof are avoided by the water-impervious top layer of $CaWO_4$. Because the layer is covered by the dense $CaWO_4$ layer, a structure which favours the transmission of light can be imparted to the CsI layer, for example the known, comparatively coarse columnar structure; for this purpose the layer may also be formed by vapour deposition. The use of the activator Tl instead of Na makes the CsI layer less susceptible to moisture. The base layer may also be formed by Re oxibromide on which the dense $CaWO_4$ layer is provided as a top layer. By varying the structure of the basic material during the deposition of the luminescent material, notably during flame or plasma spraying, or by varying the atmosphere in the working space such as the gas pressure and the temperature during vapour deposition, layers are obtained which exhibit, for example a stepped or gradual variation of their morphology. For example, a layer can thus be formed which contains grains whose size continuously decreases in the direction of the film, so that the above requirements can be satisfied and the extremely fine top layer can also act as a protective layer or at least as an optimum base for a protective layer. This method is not restricted to a single type of luminescent material, because this material can also be varied during the composition of the layer. Be it somewhat less readily, a gradual selection can then also be made between, for example, vapour deposition and spraying or sputtering of the luminescent material.

A conversion screen as shown in FIG. 2 includes a carrier 20 which has a comparatively low absorption for the X-rays 1 to be detected. Carriers which are formed by a window of an X-ray intensifier tube to be evacuated must be capable of withstanding atmospheric pressure. Carriers of this type are made of, for example titanium, so that the carrier can be comparatively thin, even as a vacuum wall, so that it will cause only little scattering, or of aluminium because this material has a low X-ray absorption due to the low atomic number, so that it is notably suitable for use as a carrier which does not act as a vacuum wall, or of other materials such as iron, because of its cost, or beryllium because of the particularly low X-ray absorption. On a surface 21 of the carrier 20 there is provided a layer of luminescent material 22. The surface 21 may be plane but may alternatively be provided with a given structure, so that a given surface structure is also imparted to the layer of conversion material. Notably when the luminescent material is provided by vapour deposition, such a structure may contribute to the formation of a desired structure in the layer. On a surface 23 of the layer of luminescent material, having a thickness of, for example from some tens to some hundreds of $\mu m$, there is provided a separating layer 24 which acts as a carrier for a photocathode 26. A separating layer of this kind is provided, for example in order to form a backing for the comparatively thin photocathode layer, for realizing improved lateral electrical conductivity and notably also for reducing contamination of the luminescent layer by substances from the photocathode or by substances used for forming the photocathode. The separating layer is also capable of improving the optical transmission between the luminescent layer 22 and the photocathode 26, for example as described in GB Patent Application No. 8510701 (PHQ 85-010) filed by Applicant on 26-04-1985. In the luminescent layer a part of the incident X-ray quanta is intercepted and converted into luminescent light. In the case of a homogeneous layer having given properties, a problem arises in that for a minimum layer thickness desired for adequate absorption excessive scattering of light occurs in the layer, so that the resolution is reduced. In a luminescent screen as described in U.S. Pat. No. 3,825,763 this drawback is mitigated in that the layer is provided with a structure of light conductors which are directed transversely of the layer. In a structure which is optimum for the conduction of light, the columns of luminescent material are distinctly separated from one another from an optical point of view. As a result, the surface of such a layer is comparatively rough and hence less suitable for the provision of a next layer, for example an intermediate layer of a photocathode. The electrical conductivity in such a layer provided with individual columns may also be less, so that an electrical charge spot could occur during imaging. When the photocathode is provided on such a rough layer, it will also be less homogeneous and disturbances of the electrical conductivity are liable to occur therein. Moreover, such a porous layer is additionally susceptible to contamination and hygroscopic properties of the layer are thus intensified. Therefore, it is important to provide the last part of the layer of luminescent material is an as dense as possible packing, so that a surface layer is obtained which has suitable lateral conductivity a smooth surface and a pronounced protective effect. Flame or plasma spraying in suitable circumstances and using a high quality material enables very dense layers to be realized for which the backing is far less decisive for the structure of the layer than during vapour deposition.

A top layer of this kind has a thickness of, for example from 1 to 10 μm and is preferably made of the same material as the preceding sub-layer; however, the latter is not necessary. A top layer of this kind can also be formed by locally heating the layer of luminescent material almost to the melting temperature, so that the surface is also suitably smoothed. When use is made of a material which deviates from that of the preceding layer, the layer should have a low absorption for luminescent light emerging from this layer. When the same material is used, this condition is usually satisfied because luminescent materials are customarily suitably transparent for own luminescent light and also because a layer having a dense structure usually has a better transmission than a layer having a grain structure. Furthermore, the protective layer preferably has a higher absorption for comparatively hard X-rays. The use of elements having a high atomic number may be useful in this respect. A low absorption for soft X-rays counteracts scatter effects caused by secondary X-rays generated in the luminescent layer. For this purpose use can be made of elements having an absorption edge which is situated directly adjacent that of the element of the actual luminescent layer which is most relevant for the disturbing secondary radiation, so in the case of CsI just above that of Cs. An X-ray conversion layer may also be provided with a first sub-layer which adjoins the substrate and which has radiation conversion, optical conductivity or absorption properties which deviate from those of the base layer. For example, a first sub-layer having a thickness of from a few to approximately 10 μm is formed with a comparatively high density, so that locally a strong absorption occurs notably for the soft radiation in the X-ray beam to be detected. In such a thin layer the luminescent light is scattered only slightly and the structured base layer conducts this light to the photocathode without substantial further scatter. Thus, the scattering caused by comparatively soft scattered X-rays in the beam is reduced. An X-ray conversion layer thus includes a first, comparatively dense sub-layer having a high absorption and a thickness of at the most approximately 10 μm, a base layer having a thickness of upto a few hundreds of μm and a pronounced columnar structure for optimum light conductivity, and a top layer which is dense again and which has a thickness of a few μm and a smooth surface. When comparatively good electrically conductive luminescent materials are used for the top layer, it will no longer be necessary to use an additional intermediate layer so that an optimum optical transmission can be realized more easily. For screens provided with a crackled structure it may be advantageous to provide this layer only after the crackling process, so that the occurence of fissures therein can be avoided. When the surface of the top layer is required to have a more or less frosted glass structure in view of optical transmission, such a structure can be realized by providing an additional top layer which has a thickness of, for example at the most 0.1 μm on the smooth top layer. Diffuse transmission can thus be realized without given rise to additional light scattering. The top layer need not necessarily consist of luminescent material and preferably contains a material having a suitably defined, fine grain structure.

In a further application in accordance with the invention, a composite layer is formed by spraying, sputtering or vapour deposition, said layer having a varying composition, viewed in the thickness direction; therein, the transitions between the layers of different material, dope or composition may also be gradual. For example, in accordance with the Patent Application PHN 11.341. NL 8500981, a material absorbing secondary X-rays can be added as a component of the material to be deposited; the share of this material in the basic material can be varied during the process, for example it may be continuously increased during the growth of the layer. In the case of spraying use can also be made of a flow material which preferably adheres around the grains of the luminescent material. When the absorption material is an activator for the luminescent material, the ratio of the partitional quantity of the activator can be varied. When use is made of CsI, for example a start can be made with Na as the activator, taken from the substrate, and during the growth of the layer Na can be gradually replaced by T1, so that the last layer contains only T1 activator. The susceptibility of the layer to water can be substantially reduced by providing a protective top layer which contains only T1 activator.

FIG. 3 shows a cassette with a first X-ray intensifier screen 9, a film 12, a scattered radiation grid 30, a carrier window 32, and a clamping device 34 with a lid portion 36 which is in this case provided with a second X-ray intensifier screen 9, a resilient pressure plate 38, and a lead shield 39. When the lid portion 36 is pressed, the film 12 will be located between two intensifier screens 9. The screen which is remote from the incident X-ray beam 1 provided with a layer which reflects luminescent light on an end face which is remote from the film. This layer need not be less transparent for X-rays. Film cassettes of this kind are used in diagnostic X-ray apparatus such as tomography apparatus, surgical fluoroscopy apparatus, mammography apparatus etc.

FIG. 4 shows an X-ray image intensifier tube 40 which includes an entrance window 42, a fibre-optical exit window 43, an entrance screen 19 which a carrier 20, a conversion layer 22 and a photocathode 26, and an exit screen 44 which is provided on the exit window 43. In conjunction with the entrance window and the exit window, an envelope 40 constitutes a vacuum wall in which there is accommodated, in addition to said screens, an electron-optical system 46 which includes electrodes 47, 48 and 49 for the imaging of electrons emerging from the photocathode on the exit screen 44. The entrance screen in the present embodiment is arranged on a substrate to be mounted in the vacuum space, so that it need not act as a vacuum wall and a smaller amount of material which is adapted better to radiation properties, can be used, without affecting the stability of shape. The curvature of the screen, notably of the photocathode, can again be easily adapted to electron-optical requirements. Thus, the entrance screen 19 as well as the exit screen 44 of such a tube may be covered by the invention.

FIG. 5 shows a diagnostic X-ray apparatus which includes such an X-ray image intensifier tube 40; in this case the tube includes a shield 50 and a scattered radiation grid 52, for example as described in the U.S. Pat. No. 4,220,890. The apparatus includes an X-ray tube 54 with an X-ray generator 55, a patient table 56 for a patient 57 to be examined, an optical lens system 58, a semi-transparent or pivotable mirror 60, an X-ray camera 62 and a television camera tube 64 with a monitor 65.

An X-ray beam 66 to be emitted by the X-ray tube 54 irradiates the object 57 and an image-carrying X-ray beam 67 is incident, via the grid 52, on the entrance screen 19 of the X-ray image intensifier tube 40. In the exit screen the image carrying X-ray beam is converted into an image-carrying electron beam 68 which is accelerated by means of the electron-optical system 46, for example to 30 Kev, in order to be imaged on the exit screen 44. An image-carrying light beam 69 generated in the exit screen forms, via the semi-transparent mirror 66, a film image in the film camera 62 or is detected by the television camera tube 64 displayed on the monitor 65, or is stored, for further, possibly digital image processing in a memory/arithmetic device (not shown). An apparatus as shown in FIG. 5 may also include a linear X-ray detection system. An entrance screen of such a system can then be made in accordance with the invention. Apparatus of this kind are used for making scannograms of objects to be examined, in which case also contradictory requirements are often imposed on the screen, said contradiction being at least mainly solved by means of the invention.

In addition to vapour deposition in different circumstances, such as deposition rate, temperature of the substrate, deposition angle etc., notably for structured layers, flame or plasma spraying for notably extremely dense layers, different sub-layers can also be formed by sputtering, for example microwave sputtering and deposition via aerosols; for the transport of the material to be deposited there is then added a carrier which disappears again after deposition on the carrier. These methods are all known per se; for example, for the aerosol method reference can be made to EP No. 3148.

What is claimed is:

1. A radiation conversion screen for detecting a propagating incident radiation beam, comprising a luminescent layer which is sensitive to said radiation and is composed of sub-layers which succeed one another in an intended direction of propagation of said radiation beam; each of said sub-layers having mutually different radiation-conversion, radiation-optical and/or technological properties wherein successive sub-layers of luminescent material have a luminescent radiation absorption which decreases in the intended propagation direction of the radiation beam; and means which orient said screen so that said radiation beam propagates in the intended direction with respect to the screen.

2. A radiaton conversion screen as claimed in claim 1 wherein successive sub-layers contain the same material, but have a mutually different morphology.

3. A radiation conversion screen as claimed in claim 1 or 2 wherein the sub-layers have a structure noise which decreases in the intended propagation direction of the radiation beam.

4. A radiation conversion screen as claimed in claim 1 or 2 wherein a first sub-layer is a comparatively thin layer and a subsequent sub-layer in the intended propagation direction of the radiation beam is a comparatively thick, luminescent layer.

5. A radiation conversion screen as claimed in claim 1 or 2 wherein a first sub-layer is a comparatively thick luminescent layer and a subsequent sub-layer in the intended propagation direction of the radiation beam is a comparatively thin layer.

6. A radiation conversion screen as claimed in claim 1 or 2 wherein a first sub-layer is a comparatively thin layer of $CaWO_4$ and a subsequent sub-layer in the intended propagation direction of the radiation beam is a comparatively thick layer of BaFCl.

7. A radiation conversion screen as claimed in claim 1 or 2 wherein a first sub-layer is a comparatively thin layer of $CaWO_4$ and a subsequent sub-layer in the intended propagation direction of the radiation beam is a comparatively thick layer of CsI.

8. A radiation conversion screen as claimed in claim 1 or 2 wherein a first sub-layer is a comparatively thin layer of $CaWO_4$ and a subsequent sub-layer in the intended propagation direction of the radiation beam is a comparatively thick layer of Re oxibromide.

9. A radiation conversion screen as claimed in claim 1 or 2 wherein a first sub-layer is a comparatively thin layer which transmits luminescent light, a next subsequent sub-layer in the intended propogation direction of the radiation beam is a comparatively thick luminescent layer and a further subsequent sub-layer is a comparatively thin layer.

10. A radiation conversion screen as claimed in claims 1 or 2, further comprising a photographic film which is sensitive to the luminescent light which is disposed at a side of the screen from which the luminescent light emerges.

11. A radiation conversion screen as claimed in claims 1 or 2, further comprising a photocathode layer and wherein an adjacent first sub-layer is matched to technological, chemical or optical properties of said photocathode layer.

12. A radiation conversion screen as claimed in claim 11, comprising a further sub-layer of CsI having a reinforced columnar structure.

13. A radiation conversion screen as claimed in claim 12, comprising a further sub-layer which forms a comparatively thin, extremely dense top layer disposed over the luminescent layer.

* * * * *